US008798903B2

(12) United States Patent
Feng

(10) Patent No.: US 8,798,903 B2
(45) Date of Patent: Aug. 5, 2014

(54) METHOD AND APPARATUS FOR DETECTING ARRIVAL AT NEW CITY AND PRODUCING INFORMATION ON NEW CITY

(75) Inventor: Kyte Feng, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 708 days.

(21) Appl. No.: 12/386,918

(22) Filed: Apr. 24, 2009

(65) Prior Publication Data

US 2010/0274482 A1 Oct. 28, 2010

(51) Int. Cl.
*G01C 21/00* (2006.01)
*G01C 21/30* (2006.01)
*G01C 21/32* (2006.01)

(52) U.S. Cl.
USPC ........... 701/211; 701/409; 701/410; 701/411; 701/412; 701/418; 701/419; 701/439; 701/400

(58) Field of Classification Search
USPC ................. 701/211, 208, 209, 400, 409–412, 701/418–419, 439; 342/357.13; 715/733, 715/764
See application file for complete search history.

(56) References Cited

U.S. PATENT DOCUMENTS 6,522,875 B1 * 2/2003 Dowling et al. ........... 455/414.3
7,461,528 B2 12/2008 Taniguchi et al.
2002/0011951 A1 * 1/2002 Pepin et al. .............. 342/357.13
2006/0089134 A1 * 4/2006 Moton et al. .................. 455/418
2009/0247151 A1 * 10/2009 Kameyama ................ 455/426.1
2010/0070166 A1 * 3/2010 Krzanowski .................. 701/202

OTHER PUBLICATIONS

Steiniger et al., Foundations of Location Based Services, 2006, Lecture Notes on LBS, Department of Geography, University of Zurich.*
Li et al., A Lattice-Based Semantic Location Model for Indoor Navigation, 2008, 9th International Conference on Mobile Data Management, References section.*
Steiniger et al.: Foundations of Location Based Services, 2006, Lecture Notes on LBS, Department of Geography, University of Zurich.*
Li et al.: A Lattice-Based Semantic Location Model for Indoor Navigation, 2008, 9th International Conference on Mobile Data Management, References section.*

* cited by examiner

*Primary Examiner* — Joy Chng
(74) *Attorney, Agent, or Firm* — Muramatsu & Associates

(57) ABSTRACT

An apparatus and method for a navigation system to detect arrival to a new city and provide information on the city such as dining, lodging, popular sightseeing place, etc. to the user. In addition, it can also provide the user a list of his or her friends in the new city according to an address book or from social networking websites. The navigation includes a detecting unit communicatively coupled with a position measuring device and a map information memory to detect whether the user is entering a new city by determining whether the user is moving across the new city border line. Further, the detecting unit indicates the user is entering a new city when the user is moving a predetermined distance away from an airport. Further, the new city information may not be shown if the user has visited the city before within a predetermined period.

16 Claims, 10 Drawing Sheets

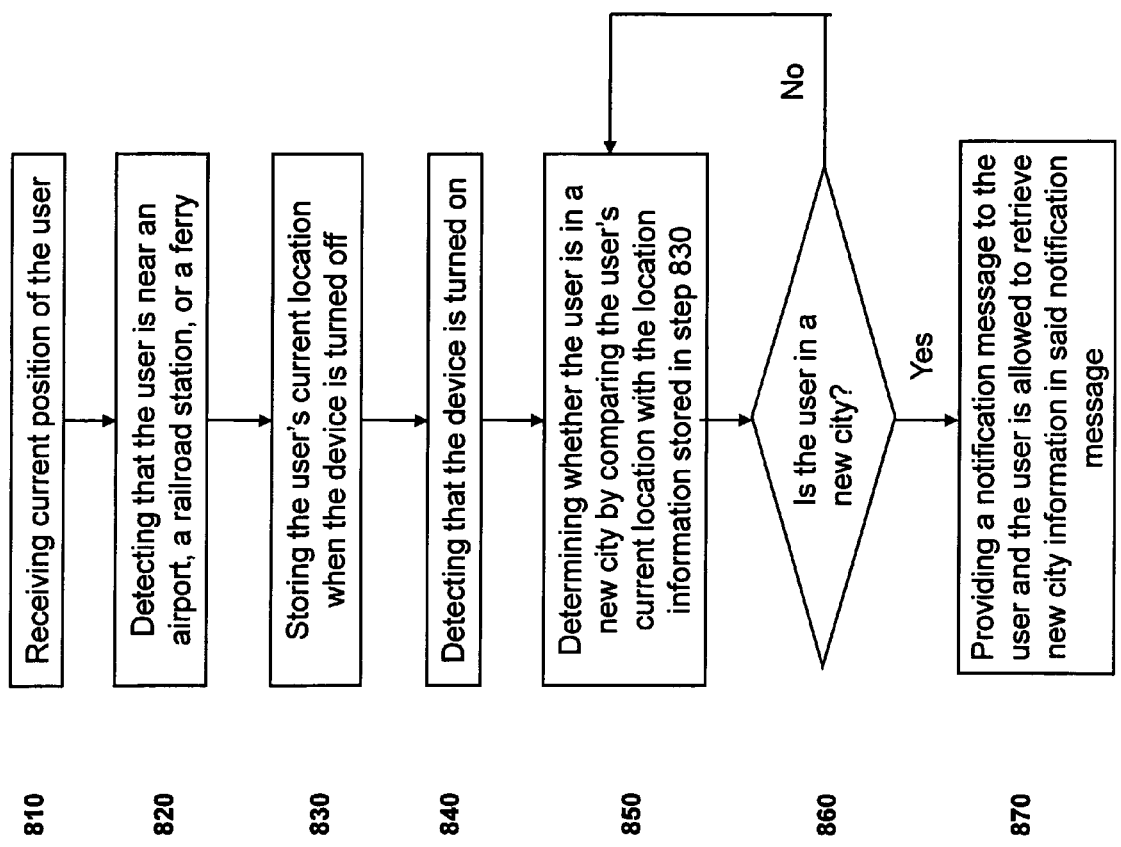

METHOD AND APPARATUS FOR DETECTING ARRIVAL AT NEW CITY AND PRODUCING INFORMATION ON NEW CITY

FIELD OF THE INVENTION

This invention relates to a method and apparatus for a navigation system, and more specifically, to a method and apparatus for a navigation system that can detect arrival at a new city and provide information regarding the new city such as dining, lodging, popular sightseeing place, sporting facilities, local events, etc. to the user.

BACKGROUND OF THE INVENTION

Recently, navigation devices, including portable navigation devices (PNDs), have become more popular and affordable for most users. The navigation system can, not only determine the user's current position by utilizing the Global Positioning System (GPS), but also provide different routing information between the user's current position and the destination. In order to perform above mentioned functions, the navigation system is usually equipped with navigation computer programs and one or more detailed database to store and provide maps, map attributes, road networks, geographical features and points-of-interests (POI) information.

Generally, the navigation system generates a preferred or optimized route after receiving destination information input by the user, and the route is usually displayed associated with a map on a display unit of the device. However, when the user is entering a new city or a location he or she is unfamiliar with, the user may need some immediate information specifically about the new city, such as dining, lodging or a quick introduction of the new city. For example, when a visitor comes to the city of Los Angeles for his very first time with little knowledge about the city, and just gets his rental car nearby the Los Angeles International Airport (LAX).

In such a situation, he probably needs to know immediately about the restaurant or hotel information, as well as famous places to visit, such as Hollywood, Disneyland, Beverly Hills, etc. If he is a sports enthusiast or music lover, he may immediately want to know the locations of sports stadiums or concert halls in the city. Those information is surely available on the Internet for everyone, however, it may be inconvenient for the visitor to retrieve those information while driving.

U.S. Pat. No. 6,522,875 issued to Dowling et al. discloses geographical web browser which allows a user to navigate a network application such as the World Wide Web by physically navigating in geographical coordinates. More specifically, the geographical web browser may be implemented in a mobile unit 105 which is operative to receive locally broadcast signals or to operate a global positioning system (GPS) receiver. As can be seen in FIG. 1, the mobile unit 105 navigates into different physical localities, different web pages are displayed by the geographical web browser.

When the mobile unit 105 crosses the town and enters a second area, a new set of web pages is downloaded relating to properties in the second area. However, the Dowling et al. patent does not disclose or teach how to determine whether the mobile unit such as a vehicle is entering a different locality (city or other administrative region). Also, the driver may be distracted when operating the web browser while driving.

U.S. Pat. No. 7,461,528 to issued to Taniguchi et al. discloses a content processing apparatus and content display apparatus which shows the content based on location information. Such location information is preferably provided to a mobile terminal user, as shown in the structure of FIG. 2. However, similar to the Dowling et al. patent noted above, the Taniguchi et al. patent does not disclose anything related to determine whether the mobile unit is entering a different or new locality.

Therefore, there remains a need for a new and improved apparatus and method in a navigation system, including portable navigation system, to detect arrival to a new city and provide information of the new city. The information of the new city includes dining, lodging, sightseeing, sports stadiums, concert halls, or social networking information to the user to have better understanding of the new city.

SUMMARY OF THE INVENTION

It is an object of the present invention to provide an apparatus and method in a navigation system, including portable navigation devices (PNDs), to detect arrival to a new city, such that the user can receive new city information in different means of transportation, such as car, bus, train, boat, etc.

It is another object of the present invention to provide new city information to the user, such as restaurants, hotels, famous places to visit, etc., after the navigation system indicates that the user is entering the new city.

It is another object of the present invention to provide social networking information in the new city, for example, the navigation system in the present invention can generate a list of the user's friends in the new city based on the area code of the phone numbers in the user's address book, or from social networking websites such as Facebook.

It is still another object of the present invention to detect arrival of the new city either by geographical city border, or by driving or moving a predetermined distance away from an airport in the new city.

It is still another object of the present invention for the user to customize new city information, and the user can decide whether or not to receive the new city information based on the city size.

A city is an inhabited place of greater size, population, or importance than a town or village. The navigation system in the present invention is adapted to distinguish city from town or village, so that the new city information may not be provided whenever the user is entering a different area, especially when the area is merely a small town. As illustrated above, a city can be distinguished from town or village according to its size, population or importance, and the same criteria may be applied to different cities. For example, the navigation system can be designed to show city information only if the city has over two million people. If the user wishes to receive city information when entering a smaller city, the navigation system in the present invention allows the user to select city size or directly enter the city name based on his or her preference.

According to one aspect of the present invention, a navigation device may include a user interface; a position measuring unit adapted to receive information about current location of the device from a global positioning system (GPS), for instance; at least one database to store and provide maps, road networks, geographical features, and POI information, wherein when the user is entering a new city, a notification message is generated and displayed on the display unit to enable the user to retrieve information of the new city. In one embodiment, the user interface can be a display unit configured to display new city information. In another embodiment, the notification message may contain the information of, but not limited to, popular restaurants, popular hotels, popular places to visit, and list of friends in the area.

In one embodiment, the navigation device includes a detecting unit adapted to detect geographical city border to determine whether the user is entering the new city. In another embodiment, the detecting unit may determine that the user is entering a new city when the user is moving a predetermined distance away from an airport in the city.

In still another embodiment, the function of detecting arrival to a new city can be turned off by the user, so that the new city information is not shown even when the vehicle is entering into a new city. When the user turns on the function again and the user is at another new city, the device immediately detects the user's current location and provide new city information thereat.

In a further embodiment, the user can customize the information in the notification message. For example, if the user only wants to know about restaurant and hotel information whenever he or she enters a new city, the user can customize the notification message to select his or her preferable information.

In still a further embodiment, the navigation system in the present invention includes memory devices to store when the new city has been visited. If the user visits the same city again within a predetermined period of time, the new city information may not be shown to the user.

In another aspect, a method of using a device to provide new city information to a user includes the steps of: receiving current position of the user, detecting whether the user is entering a new city, providing a notification message to the user entering a new city and allowing the user to retrieve new city information in said notification message.

In one embodiment, the step of detecting whether the user is entering a new city includes a step of detecting whether the user is crossing geographical city border. In another embodiment, the step of detecting whether the user is entering a new city includes a step of detecting whether the user is moving a predetermined distance away from an airport in the new city.

In the method of the present invention, the step of receiving current position of the user may include the step of using a position and distance measuring unit in the device to receive information about current position from GPS signals.

In the method of the present invention, the map information is communicatively coupled with the position and distance measuring unit and the detecting unit, such that the detecting unit can determine whether the user is entering a new city.

The present invention together with the above and other advantages may best be understood from the following detailed description of the embodiments of the invention illustrated in the drawings below.

BRIEF DESCRIPTION OF THE DRAWINGS

FIG. 8 is a flow chart showing an example of operational steps of the present invention where the city information may be selectively retrieved by the user when the user turns off the navigation device in one city and turns on in another city.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

The present invention relates to an apparatus and method for a navigation system, including portable navigation devices (PNDs), to detect arrival to a new city. More specifically, the present invention discloses a navigation system or other electronic device to detect arrival to the new city and provide the information on the new city such as dining, lodging, popular sightseeing place, shopping, sports gyms, music halls, etc. to the user. Furthermore, the present invention can promote social networking activities by providing a list of the user's friends in the new city according to the area code of the phone numbers in the user's address book, or from social networking websites such as Facebook.

Figure 1:
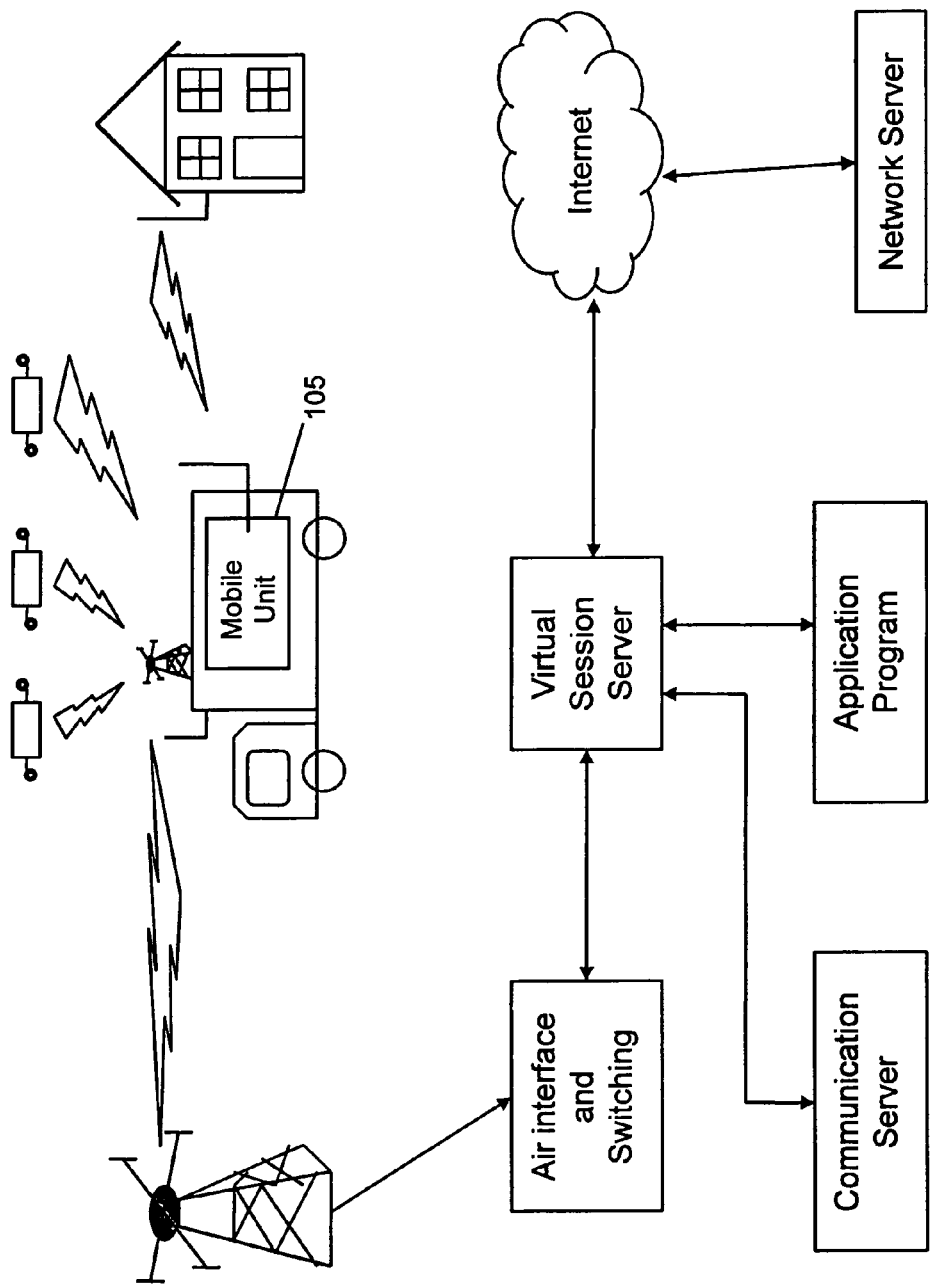
FIG. 1 illustrates a prior art, in which the geographical web browser is implemented in a mobile unit which is operative to receive locally broadcast signals.
Figure 2:
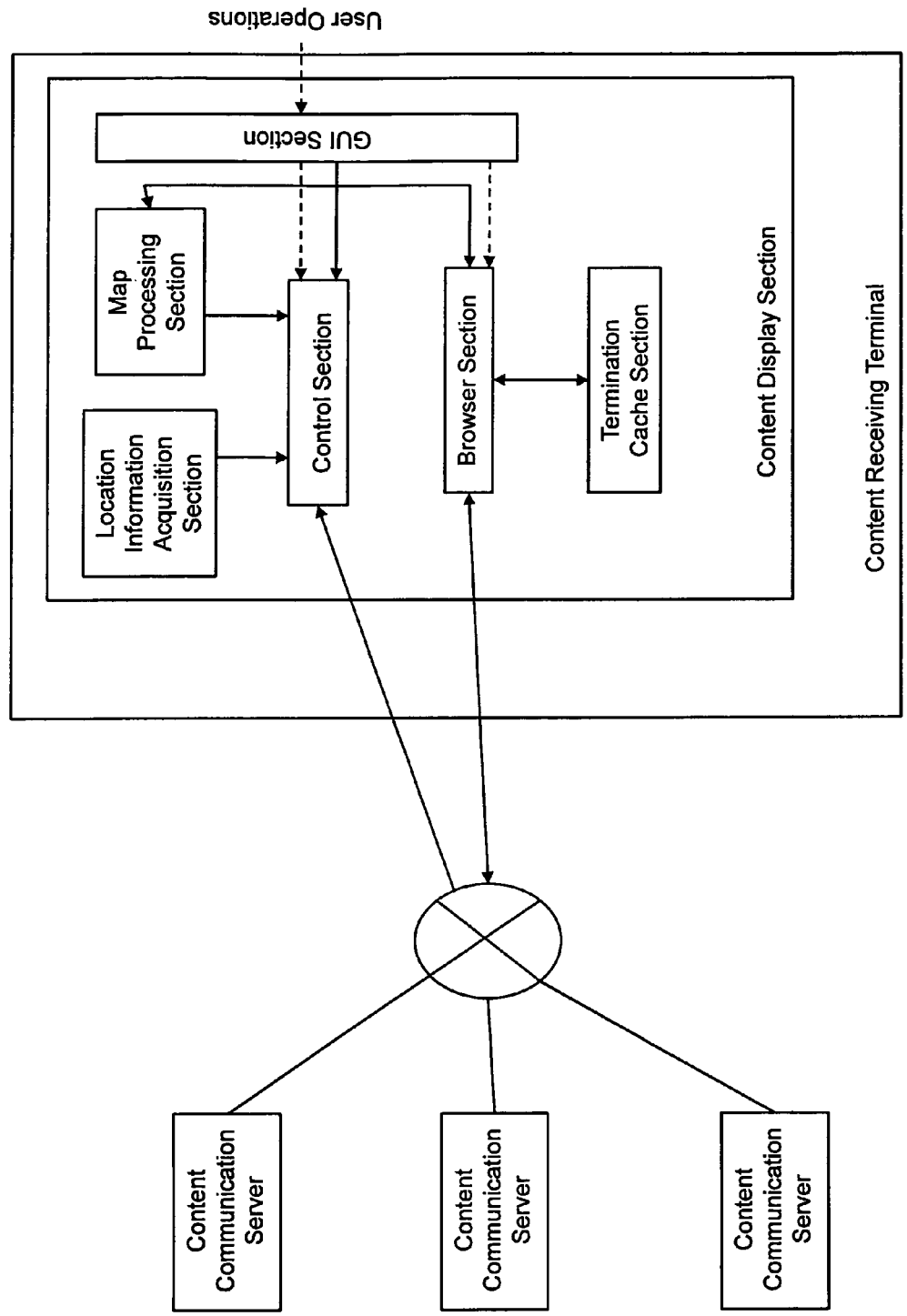
FIG. 2 illustrates a prior art discloses a content processing apparatus and content display apparatus based on location information, and the location information is preferably provided to a mobile terminal user
Figure 3:
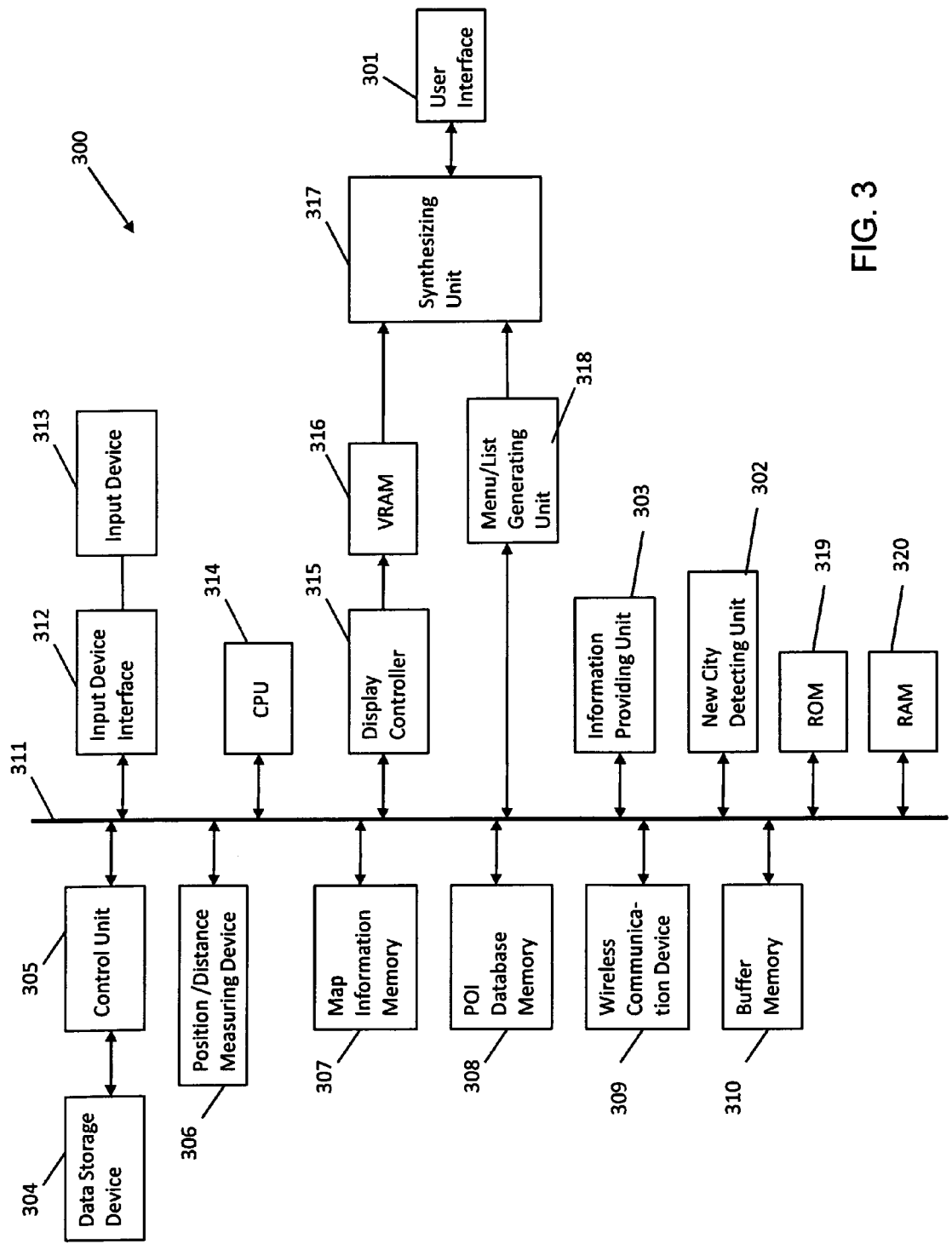
FIG. 3 is a block diagram showing an example of functional structure of a vehicle navigation system implementing the present invention to detect arrival to a new city and provide the information related to the new city to the user.

FIG. 3 is a block diagram showing an example of structure of a navigation system 300 for implementing the present invention. As can be seen in FIG. 3, the navigation system 300 includes a user interface 301, a detecting unit 302 adapted to detect and determine whether the vehicle or the user is entering a new city. An information providing unit 303 is triggered to provide new city information, such as dining, lodging, popular sightseeing place, etc. to the user when the detecting unit 302 indicates that the user is entering a new city.

In one embodiment, the user interface 301 can be a display unit configured to display, among others, new city information. The navigation system 300 also includes a data storage device 304 such as a hard disc, CD-ROM, DVD or other storage means for storing the map data. The data storage device 304 also stores various other information including points of interest information and city information, etc. that can be used for the present invention.

The navigation system 300 includes a control unit 305 for controlling an operation for reading the information from the data storage device 304, and a position and distance measuring device 306 for measuring the present user or vehicle position. For example, the position and distance measuring device 306 has a vehicle speed sensor for detecting a moving distance, a gyroscope for detecting a moving direction, a microprocessor for calculating a position of the user or vehicle, a GPS (global positioning system) receiver for receiving GPS signals from artificial satellites for also calculating a current position of the user or vehicle.

The block diagram of FIG. 3 further includes a map information memory 307 for storing the map information which is retrieved from the data storage device 304, a POI database memory 308 for storing database information such a point of interest (POI) information which is read out from the data storage device 304, an input device 313 for executing a menu selection operation, an enlarge/reduce operation, a destination input operation, etc. and an input device interface 312. In one embodiment, the input device 313 is a remote controller.

Still referring to FIG. 3, the navigation system 300 includes a bus 311 for interfacing the above units in the system, a processor (CPU) 314 for controlling an overall operation of the navigation system 300, a ROM 319 for storing various control programs such as a route search program and a map matching program necessary for navigation control, a RAM 320 for storing a processing result such as a guide route, a display controller 315 for generating map image (a map guide image and an arrow guide image) on the basis of the map information, a VRAM 316 for storing images generated by the display controller 315, a menu/list generating unit 318 for generating menu image/various list images, a synthesizing unit 317, a wireless communication device 309 to retrieve data from a remote server through wireless communication, and a buffer memory 310 for temporary storing data for data processing.

Figure 6:
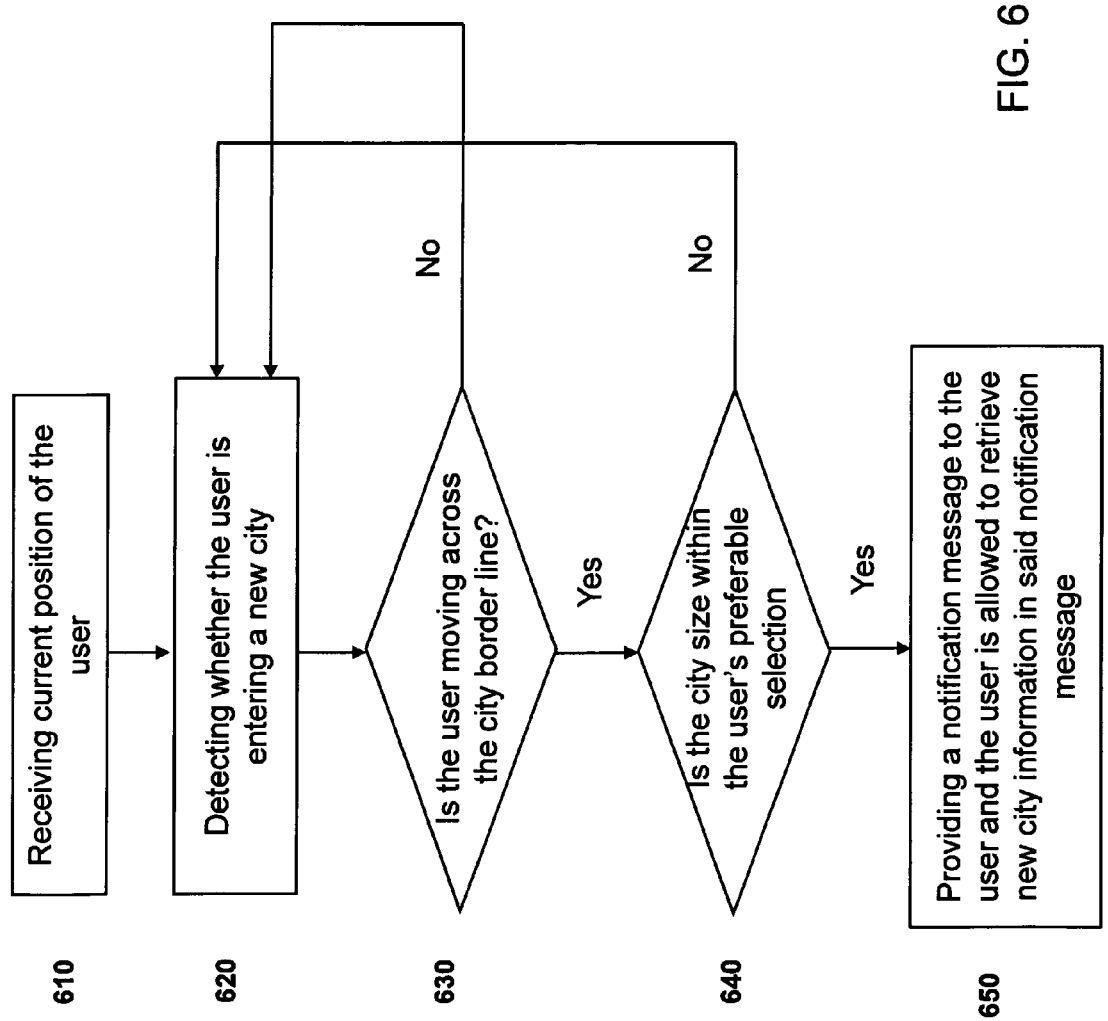
FIG. 6 is a flow chart showing an example of operational steps of the present invention where the new city information may be shown when the user is moving across the city border line.
Figure 7:
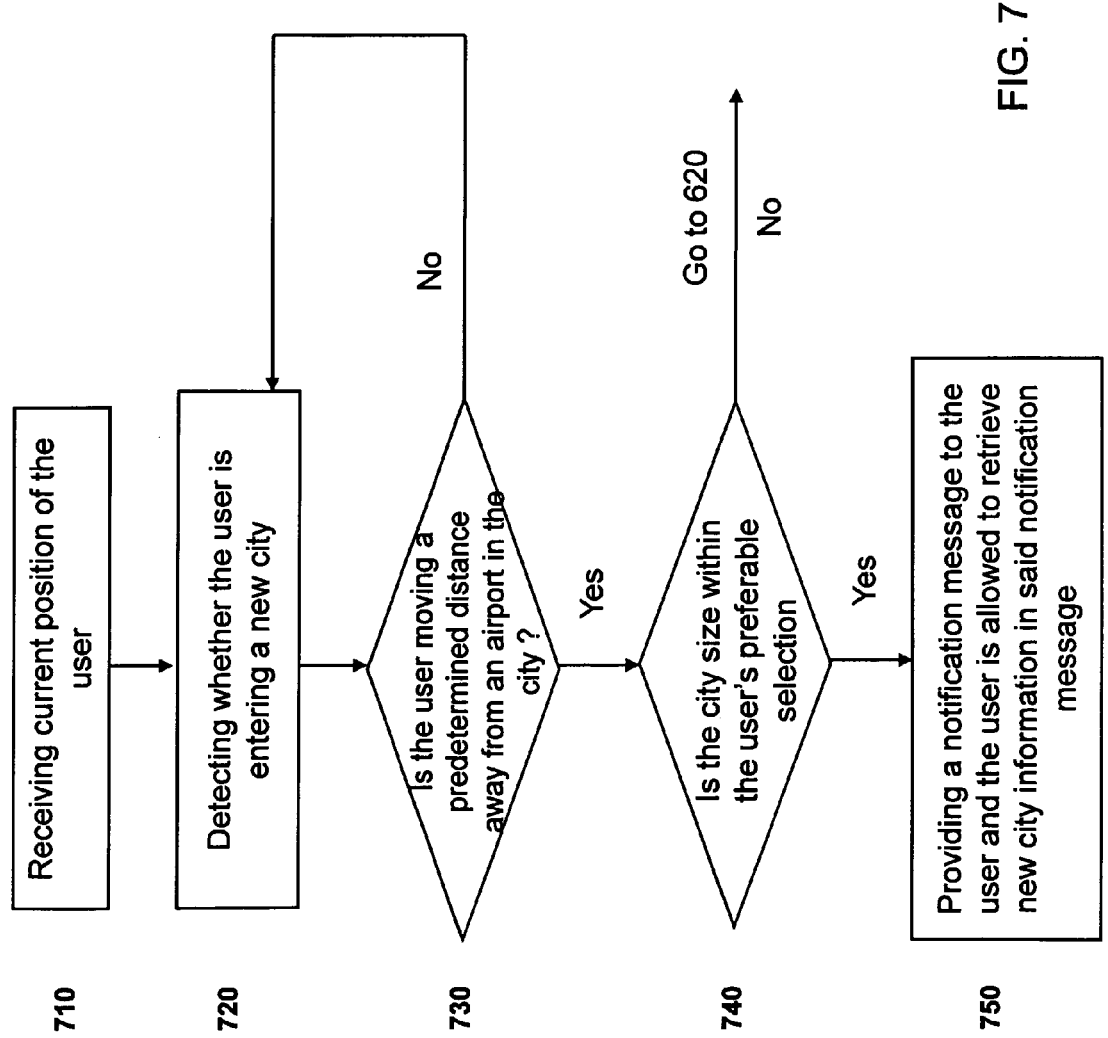
FIG. 7 is a flow chart showing an example of operational steps of the present invention where the new city information may be shown when the user is moving a predetermined distance away from the airport.

A program for conducting the operation of detecting the arrival of new city and providing the information on the new city in the present invention shown in the flow charts of FIGS. 6 and 7 is stored in the ROM 319 or other memory and is executed by the CPU 314 or a separate processor. Typically, the CPU 314 controls an overall operation of the navigation system 300 in addition to the arrival detection and information retrieval of the present invention.

Figure 3A:
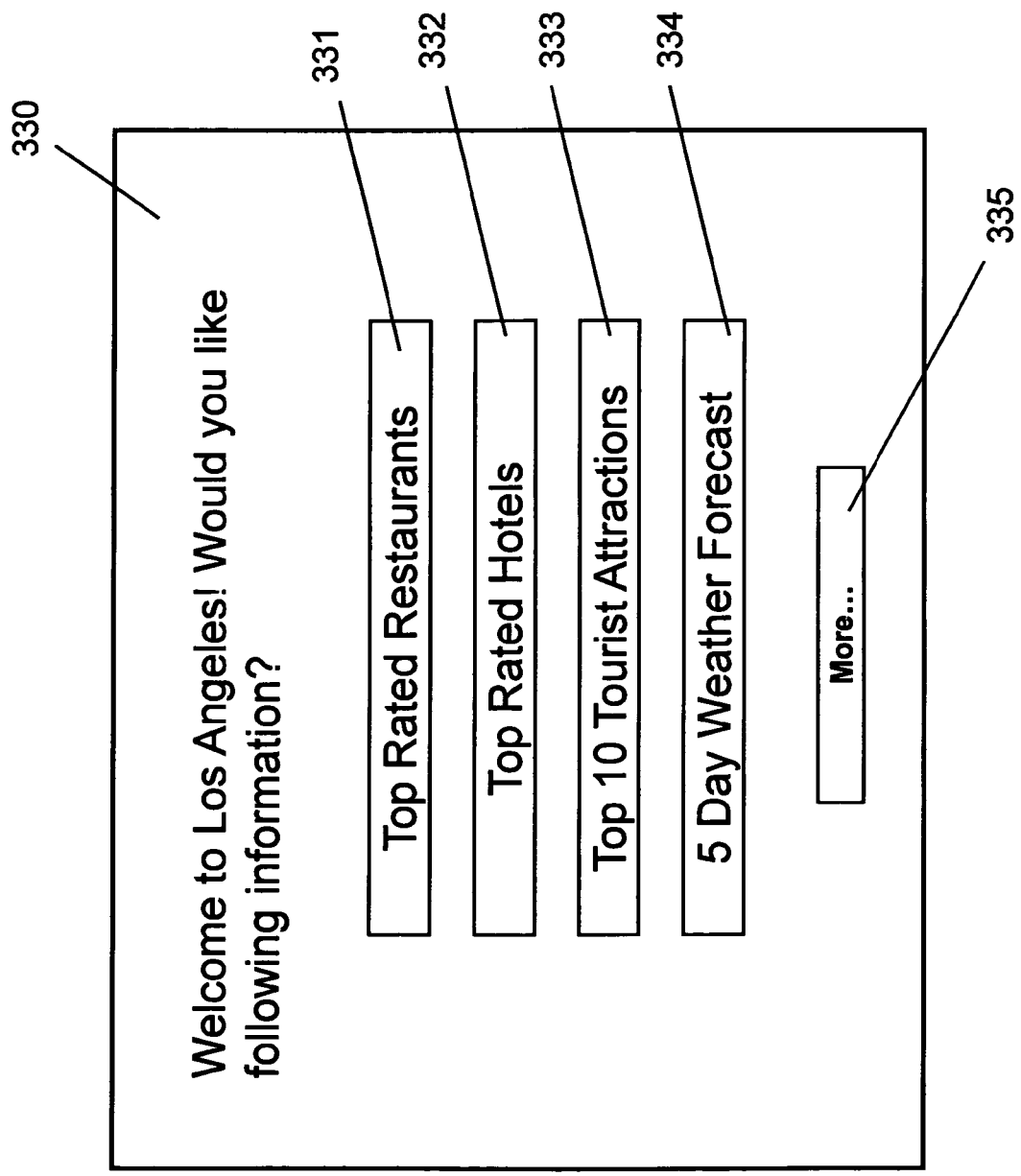
FIG. 3a is a schematic diagram showing an example of a new city information window in accordance with the present invention which includes information on dining, lodging, top 10 tourist attractions, etc. of the new city.
Figure 4:
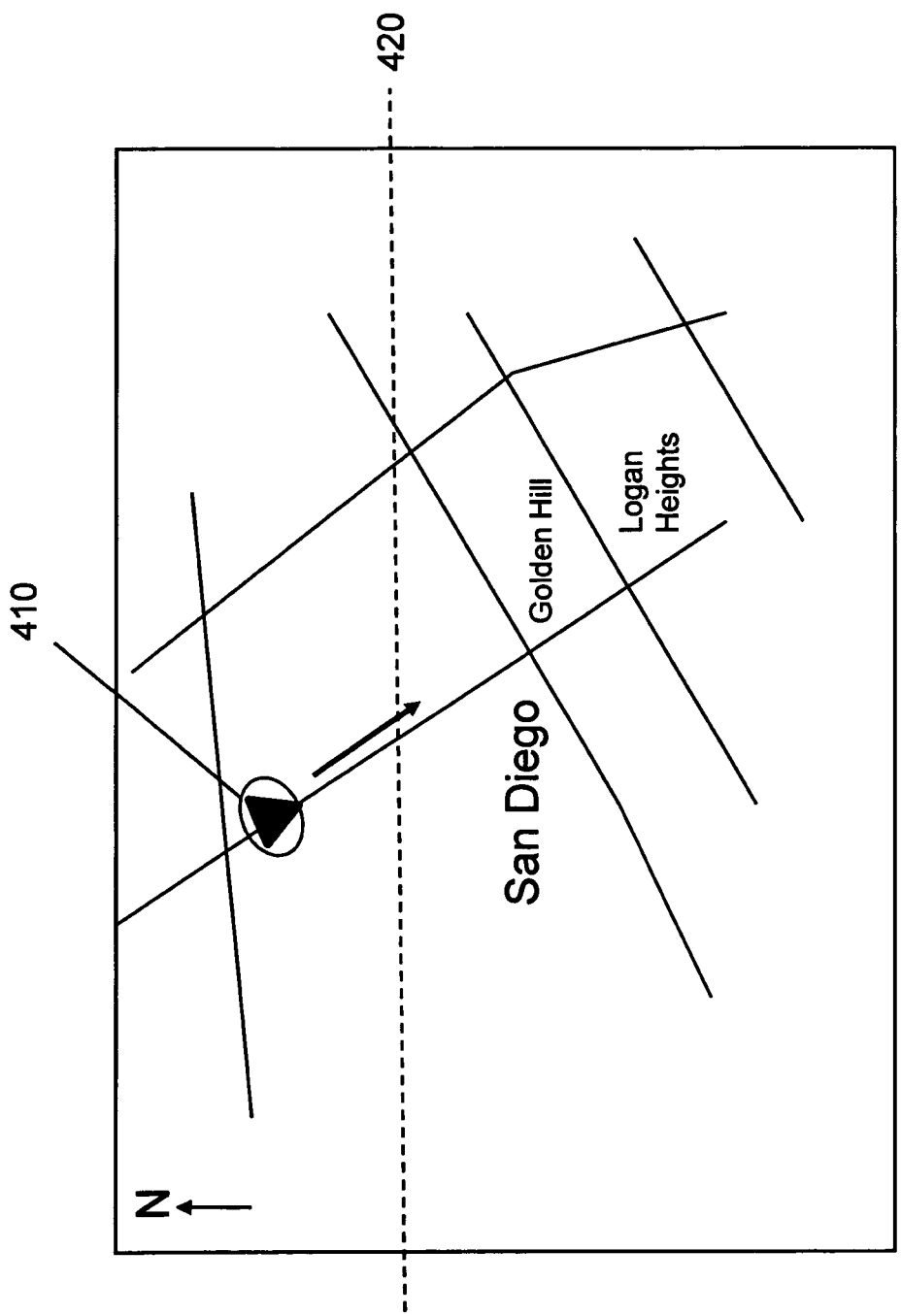
FIG. 4 is a schematic diagram showing an example of display of a navigation device in the present invention where the new city information may be shown when the user is moving across the border line between the cities.

In one embodiment according to FIG. 4, when the user is driving a vehicle, the detecting unit 302 detects whether the vehicle is entering a new city. More specifically, the detecting unit 302 is communicatively coupled with the position and distance measuring device 306 and the map information memory 307 to detect a geographical city border line 420 while the vehicle 410 is moving. Once the vehicle 410 is moving across the city border line 420 to an area of another city which is qualified as a "city" according to the criteria previously illustrated, such as size, population, importance, etc., the information providing unit 303 may be triggered and operatively coupled with the menu/list generating unit 318 to provide a new city information window 330 on the user interface 301, as can be seen in FIG. 3a.

The new city information window 330 may include menu keys of "top rated restaurants" 331, "top rated hotels" 332, "top 10 tourist attractions" 333, and "5 day weather forecast" 334. In addition, further information on the new city can be obtained by simply clicking "More" button 335. On the other hand, the user can customize the content of the new city information window 330. For example, if the user only needs dining and lodging information in each new city, the user is allowed to remove the keys of "top 10 tourist attractions" 333, "5 day weather forecast" 334, and "More" 335 from the new city information window 330.

Figure 4A:
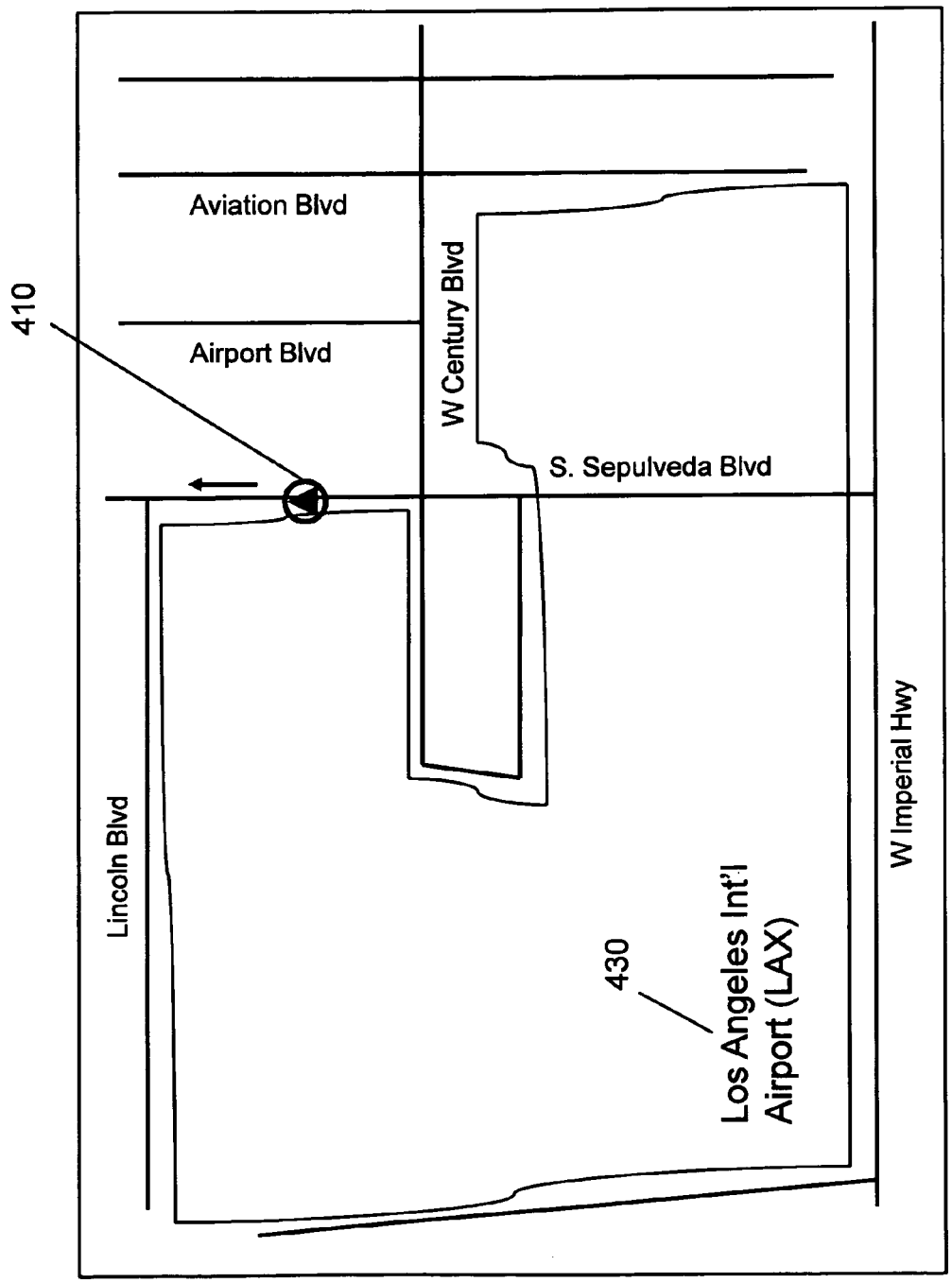
FIG. 4a is a schematic diagram showing an example of display of a navigation device in the present invention where the new city information may be shown when the user is moving a predetermined distance away from the airport.

In another embodiment illustrated in FIG. 4a, the information providing unit 303 may be triggered to provide new city information when the detecting unit 302, which is communicatively coupled with the position and distance measuring device 306 and the map information memory 307. The information providing unit 303 indicates that the user is driving the vehicle a predetermined distance away from an airport in the new city.

For example, when the detecting unit 302 indicates that the vehicle 410 has been driven 5 miles away from the Los Angeles International Airport (LAX) 430, the information providing unit 303 is triggered to provide Los Angeles city information 330 as shown in FIG. 3a. This configuration can be used to provide new city information to visitors who are unfamiliar with the new city and just get rental car from the airport. Even though the user is relatively familiar with the new city, the information regarding the city may be useful for quickly finding phone numbers, locations, business hours, etc. of facilities in the city.

In addition to the form of vehicle navigation system, the navigation system 300 may be portable, hand-held type and be used in different means of transportation, such as bus, train, boat, etc. For example, when the user carries the portable navigation system 300 with him in the train, the new city information may still be triggered when the train is moving across the city border line or moving a predetermined distance away from the airport in the city.

As noted above, the navigation system in the present invention provides a convenient interface to the user to receive new city information whenever he or she is entering a new city. However, some small city information may be unnecessary to the user and may cause driver distraction while the user is driving. For example, if the user drives from Los Angeles to San Francisco, he or she may not need new city information on small cities such as Burbank or Fresno. Especially, when the user has no intention to stop-by such cities during the trip to San Francisco and just wants to enjoy the driving, the information on each of such cities may be useless and distracting.

Figure 5:
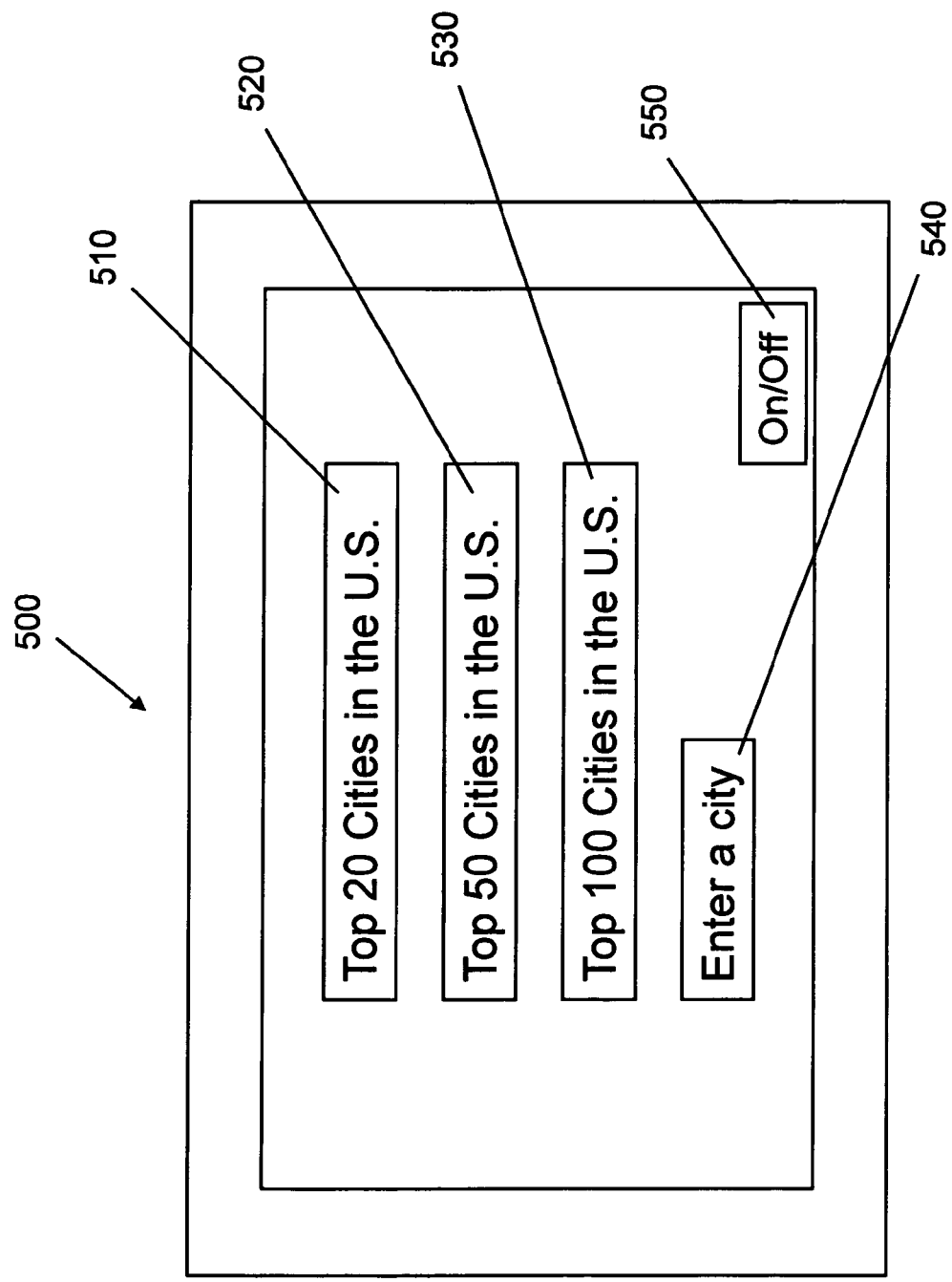
FIG. 5 is a schematic diagram showing an example of display of a navigation device in the present invention which allows the user to select the city of preferable size for arrival detection.

Therefore, as can be seen in FIG. 5, a selection table 500 includes a plurality of selection buttons to enable the user to select the city or cities to receive new city information based on the city size. For the same trip noted above from Los Angeles to San Francisco, if the user selects a key of "top 20 cities in the U.S." 510, he or she may only receive the new city information of San Jose and San Francisco along the route. On the other hand, if the user selects a key of "top 50 cities in the U.S." 520 or even "top 100 cities in the U.S." 530, the user may receive new city information of more cities along the route. If the user wants to know new city information of a specific city, the user is allowed to enter the city name(s) by clicking a key 540 which is operatively coupled with the input device 313 to specify the name of such a city.

The navigation system in the present invention further provides an "on/off" button 550 for the user to turn on or turn off this function. If the user turns off this function in one city and needs new city information while traveling to another city, he or she can turn on this function and the detecting unit 302 (coupled with position/distance measuring device 306 and map information memory 307) may trigger the information providing unit 303 to provide current city information to the user. In another embodiment, the new city information window 330 may not be displayed if the new city has been visited by the user within a predetermined period of time since the new city information may still be fresh to the user.

In one embodiment, the new city information is stored in the ROM 319, POI database memory 308 or other memory in the navigation system 300. As noted above, such new city information is typically stored originally in the data storage device 304 and transferred to the POI database memory 308 or other memory in the navigation system 300. In another embodiment, the new city information can be transmitted wirelessly from a remote server, the Internet or other communication networks through the wireless communication device 309.

FIG. 6 is a flow chart showing an example of operational steps of the present invention where the new city information is shown when the user is moving across the city border line. In the step 610, the navigation system constantly checks the current position of the user or user's vehicle. Especially, the navigation system detects whether the user is entering a new city in the step 620 by comparing, for example, the current position of the user and the boarder line between two or more cities.

Thus, in step 630, it is determined whether the user is moving across the city border line, and if the answer is negative, the process goes back to the step 620 to repeat the steps 620 and 630. If the answer in the step 630 is affirmative, the navigation system determines whether the size of the new city is within the user's preferable selection at step 640. If the answer is negative, the process goes back to the step 620. If the answer in the step 640 is affirmative, the navigation system provides a notification message to the user and allows the user to retrieve the new city information in step 650.

In one embodiment, the position and distance measuring device 306 in the navigation system 300 is adapted to receive the user's current position in step 610. For example, the user's current position can be determined by GPS signals from the artificial satellites in addition to the signals from the sensors in the navigation system. As illustrated above, the map information memory 307 is adapted for storing the required portion of the map information which is read from data storage device 304.

In addition, the map information memory 307 is communicatively coupled with the position and distance measuring device 306 and the detecting unit 302, such that the detecting unit 302 can determine whether the user is entering a new city in the step 620 noted above. In one embodiment according to the step 630, the detecting unit 302 may indicate that the user is entering a new city if the user is moving across the city border in the manner as illustrated in FIG. 4.

Again, the user can be in any means of transportation, such as a car, bus, train, etc., or the user can simply be walking with the portable navigation system on hand. Furthermore, as shown in FIG. 5, the navigation system 300 in the present invention allows the user to filter new city information based on the user's preference and city sizes. If the user is moving across the border line to the city of the user's preferable selection, as depicted in the step 640, the information providing unit 303 is triggered to display a new city information window 330 to inform the user that the user is now at a new city, and allow the user to retrieve the new city information therein.

In one embodiment, the new city information can be retrieved from the POI database memory 308 adapted for storing database information such a point of interest (POI) information which is read out from the data storage device 304. In another embodiment, the new city information can be transmitted from the Internet, a remote server or other communication networks through the wireless communication device 309. The city information can also be created by the user in the navigation system in the manner that the user creates the address book in the navigation system.

On the other hand, if the size of the city that the user just moves across is not in his or her preferable selection (based on size), the information providing unit 303 may not be triggered to provide new city information to the user. The identical steps 610 to 630 may be repeated when the user is moving across next city border if the size or other factors of the cities are not within the preferable selection made by the user.

FIG. 7 is a flow chart showing an example of operational steps of the present invention where the new city information may be shown when the user is moving a predetermined distance away from the airport. In the example of FIG. 7, the steps 710 and 720 are similar to the steps 610 and 620 in FIG. 6. In step 730, when the user is moving a predetermined distance away from an airport in the city of the user's preferable selection in step 740, the information providing unit 303 is triggered to provide a new city information window 330 to the user that the user is now at a new city, and allow the user to retrieve new city information therein in step 750.

As stated above, this configuration can be used for visitors who are unfamiliar with the new city and just get rental car from the airport. If the city is not within the user's preferable selection, the navigation system 300 may determine whether the vehicle is entering the next new city based on whether the vehicle is moving across the city border line (steps 620, 630) since it may be unnecessary and impractical to use the airport as a reference point for subsequent new cities. In the process of FIG. 7, in addition to the airport, it is also possible to detect a predetermined distance away from a train station, a central bus terminal, a ferry terminal, etc. of the new city.

FIG. 8 is a flow chart showing an example of operational steps of the present invention where the city information may be selectively retrieved by the user when the user turns off the navigation device in one city and turns on in another city. In step 810, the navigation system determines the user's current position by, for example, analyzing the GPS signals from the satellites. In a further step 820, the navigation system 300 detects whether the user is near an airport, a railroad station, or a ferry terminal, etc. As illustrated above, new city information may be provided to the user if the user is driving a predetermined distance away from the airport in a new city.

In one embodiment, the navigation system 300 may be portable and when the user is using the navigation system 300 in a train or a boat which is moving a predetermined distance from a train station or a ferry terminal, the new city information may be provided to the user as well. In one embodiment, the user may turn off the navigation system 300. For example, when the user wishes to bring his car to travel from one island to another, he may have to shut his car (and the navigation system) down when the car is on a car ferry. The ROM 319 or other memory devices in the navigation 300 store the user's current location when the user turns the system off, as in step 830.

Furthermore, if the user turns on the navigation system 300 again at step 840, for example, when driving off the car ferry, the system compares the user's current location with the location information stored in ROM 319 or other memory devices to determine whether the user is in a new city, as depicted in step 850. If the user is determined to be in a new city, the information providing unit 303 is triggered to provide a new city information window 330 to the user that the user is now at a new city, and allows the user to retrieve new city information therein in steps 860 and 870.

In another embodiment, if the user is determined to be in a new city, the information providing unit 303 can be triggered to provide new city information to the user even without the display unit. For example, when the user turns on the navigation system 300 in San Francisco, through a text-speech technology, the system may say "Welcome to San Francisco, would you like to know the top ten restaurants here?" If the user answers "Yes", the system would then tell the user the top ten restaurants in San Francisco. Instead, if the user is not interested in top ten restaurants, the navigation system 300 may ask the user if the user needs other information about San Francisco.

If the navigation system 300 indicates that the user is not in a new city, the information providing unit 303 may not be triggered to provide new city information to the user and identical steps 850 to 860 may be repeated until the user is entering a new city.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A portable navigation system comprises:
    a display unit configured to display images for navigation operations including map images;
    a position measuring unit adapted to receive information about current location of a user;
    at least one database to store and provide maps, map attributes, road networks, geographical features, and point-of-interest (POI) information;
    a detecting unit communicatively coupled with the position measuring unit and the database and configured to automatically detect whether the user is entering a new city selected based on a range of population; and
    an information providing unit configured to produce new city information
    wherein the detecting unit causes to change the images on the display to a new city message screen when the user is entering a new city of the selected population range where the new city message screen is configured to allow the user to request new city information; and
    wherein the information providing unit causes to produce the new city information requested by the user on the display.

2. The portable navigation system of claim 1, wherein the detecting unit indicates the user is entering the new city when the user is moving across city border line, or the user is moving a predetermined distance away from an airport of the new city.

3. The portable navigation system of claim 1, wherein the portable navigation system further comprises a memory unit adapted to store a first visiting date of the new city, compare a second visiting date with the first visiting date of the new city, and if the new city has been visited repeatedly within a predetermined period of time, the new city information is not displayed to the user.

4. The portable navigation system of claim 1,
    wherein the portable navigation system provides a city selection table which allows the user to determine the size of city to receive new city information, and
    wherein the notification message containing new city information is provided to the user when the user is entering the new city of the driver's preferable size.

5. The portable navigation system of claim 1, wherein the new city information is stored in the database of the navigation system, or transmitted from a remote server, the Internet or other communication networks.

6. A method of providing new city information from a navigation device to a user comprises the steps of:
    receiving a first position of the user;
    storing the user's first position when the device is turned off, retrieving a user's second position when the navigation device is again turned on and comparing the user's second position with the user's first position stored in the device;
    determining whether the user is entering a new city selected based on a range of population;
    changing an image on a display unit to a new city message screen when the user is entering a new city of the selected population range where the new city message screen is configured to allow the user to request new city information; and
    displaying the new city information requested by the user on the display unit;
    wherein the step of determining whether the user is entering a new city comprises a step of automatically detecting whether the user is entering the new city of the selected population range by a detecting unit communicatively coupled with a position measuring unit and a database.

7. The method of claim 6, wherein the step of determining whether the user is entering a new city comprises a step of determining whether the user is moving across city border line or whether the user is moving a predetermined distance away from an airport of the new city.

8. The method of claim 7, wherein the detecting unit is adapted to determine whether the user is moving across a city border line or whether the user is moving a predetermined distance away from an airport of the new city.

9. The method of claim 6, wherein the step of allowing the user to retrieve new city information comprises a step of retrieving the new city information from the database of a navigation system, or from a remote server, the Internet or other communication networks, and wherein the step of determining whether the user is entering a new city comprises a step of providing a city selection table to the user to select the size of the city to receive new city information.

10. The method of claim 6, wherein the step of displaying the new city information to the user comprises a step of storing a first visiting date of the new city, comparing a second visiting date with the first visiting date of the new city, and if the new city has been visited repeatedly within a predetermined period of time, the new city information is not displayed to the user.

11. An apparatus for providing new city information to a user comprises:
    a user interface configured to display images including map images;

a position measuring unit to provide the user's current position;

an information providing unit; and a detecting unit, wherein the position measuring unit stores a user's first position where the apparatus is turned off and retrieves a user's second position where the apparatus is again turned on, and the information providing unit is adapted to provide new city information to the user on the user interface when the user is entering a new city selected based on a range of population; and wherein the detecting unit which is communicatively coupled with the position measuring unit and at least one map database, causes to change the images on the user interface to a new city message screen when the user is entering a new city of the selected population range where the new city message screen is configured to allow the user to request new city information; and wherein the information providing unit causes to display the new city information requested by the user on the user interface.

12. The apparatus of claim 11, wherein the detecting unit indicates the user is entering a new city when the user is moving across city border line, or the detecting unit determines that the user is moving a predetermined distance away from an airport of the new city.

13. The apparatus of claim 11, wherein the apparatus further comprises a memory unit adapted to store a first visiting date of the new city, compare a second visiting date with the first visiting date of the new city, and if the new city has been visited repeatedly within a predetermined period of time, the new city information is not displayed to the user.

14. The apparatus of claim 11, wherein the information providing unit provides a city selection table which allows the user to select the size of city to receive new city information, and wherein the notification message containing new city information is provided to the user when the driver is entering the new city of the user's preferable size.

15. The apparatus of claim 11, wherein the new city information is stored in the database of the apparatus, or transmitted from a remote server, the Internet or other communication networks.

16. The apparatus of claim 11, wherein the user interface comprises a voice recognition unit adapted to recognize the user's response when the information providing unit provides the new city information to the user by voice.

* * * * *